United States Patent
Koike et al.

(10) Patent No.: US 8,547,680 B2
(45) Date of Patent: Oct. 1, 2013

(54) IGNITION SYSTEM, GAS GENERATING DEVICE FOR AIRBAG, AND GAS GENERATING DEVICE FOR SEATBELT PRETENSIONER

(75) Inventors: Hideyuki Koike, Hyogo (JP); Shigeru Maeda, Hyogo (JP); Hirotaka Mukunoki, Hyogo (JP)

(73) Assignee: Nipponkayaku Kabushikikaisha, Tokyo (JP)

( * ) Notice: Subject to any disclaimer, the term of this patent is extended or adjusted under 35 U.S.C. 154(b) by 227 days.

(21) Appl. No.: 13/127,469

(22) PCT Filed: Nov. 5, 2009

(86) PCT No.: PCT/JP2009/068928
§ 371 (c)(1),
(2), (4) Date: May 3, 2011

(87) PCT Pub. No.: WO2010/053138
PCT Pub. Date: May 14, 2010

(65) Prior Publication Data
US 2011/0210535 A1  Sep. 1, 2011

(30) Foreign Application Priority Data
Nov. 5, 2008 (JP) ................................. 2008-284115

(51) Int. Cl.
*F23Q 3/00* (2006.01)
(52) U.S. Cl.
USPC ..................... 361/247; 102/202.7; 102/202.5; 102/202.14; 102/206; 102/200

(58) Field of Classification Search
USPC .............. 102/200, 202.7, 202.5, 202.14, 206; 361/251, 257
See application file for complete search history.

(56) References Cited

U.S. PATENT DOCUMENTS

| 5,099,762 A * | 3/1992 | Drapala ..................... 102/202.1 |
| 5,544,585 A | 8/1996 | Duguet et al. |
| 5,672,841 A * | 9/1997 | Monk et al. ................ 102/202.4 |
| 8,104,404 B2 * | 1/2012 | Maeda et al. .............. 102/202.7 |
| 8,250,978 B2 * | 8/2012 | Mukunoki et al. ......... 102/202.7 |
| 2006/0086277 A1 * | 4/2006 | Bossarte et al. ............. 102/200 |
| 2009/0160166 A1 | 6/2009 | Kataoka et al. |
| 2009/0200779 A1 | 8/2009 | Maeda et al. |
| 2010/0066067 A1 | 3/2010 | Maeda et al. |
| 2010/0072736 A1 | 3/2010 | Maeda et al. |

FOREIGN PATENT DOCUMENTS

| JP | 2002526328 A | 4/2000 |
| JP | 3294582 B | 9/2000 |
| JP | 2004001723 A | 1/2004 |
| JP | 3118048 U | 1/2006 |

(Continued)

OTHER PUBLICATIONS

Machine translation of JP3294582, Sep. 8, 2000, Duguet et al.

(Continued)

*Primary Examiner* — Rexford Barnie
*Assistant Examiner* — Rasem Mourad
(74) *Attorney, Agent, or Firm* — Allston L. Jones; Peters Verny, LLP (57) ABSTRACT

There is provided an ignition system which is capable of surely operating by electric energy stored in a capacitor for ignition while separating an igniter from electric circuits for communication and ignition without producing improper operation through static electricity and noise and is compact and excellent in the productivity.

23 Claims, 7 Drawing Sheets

(56) References Cited

FOREIGN PATENT DOCUMENTS

| | | | |
|---|---|---|---|
| JP | 2007183042 A | 7/2007 | |
| JP | 2008138943 A | 6/2008 | |
| JP | 2008138948 A | 6/2008 | |
| WO | 2008/066175 A1 | 6/2008 | |

OTHER PUBLICATIONS

Machine Translation of JP2004-001723A, Jan. 8, 2004, Daicel Chem Ind Ltd.

Machine Translation of JP2007-183042, Jul. 19, 2007, Nippon Kayaku Co. Ltd.

Machine translation of JP 3118048U, Jan. 19, 2006, Nippon Kayaku Co. Ltd.

Machine translation of JP 2002-526328, Apr. 13, 2000, Robert Bosch Gmbh.

Machine translation of JP 2008138943, Jun. 19, 2008, Nippon Kayaku Co. Ltd.

Machine Translation of JP 2008138948, Jun. 19, 2008, Nippon Kayaku Co. Ltd.

Office Action dated Apr. 17, 2013, Chinese application No. 200980151719.2 and translation of office action.

\* cited by examiner

IGNITION SYSTEM, GAS GENERATING DEVICE FOR AIRBAG, AND GAS GENERATING DEVICE FOR SEATBELT PRETENSIONER

CROSS-REFERENCE TO RELATED APPLICATIONS

This application claims priority from PCT application No. PCT/JP2009/068928, filed on Nov. 5, 2009, which is hereby incorporated by reference in its entirety, and this application further claims priority to Japanese Patent Application No. 2008-284115 filed on Nov. 5, 2008.

TECHNICAL FIELD

The present invention relates to an ignition system for a gas generating device used in a safety device for automobiles such as airbag or the like.

The present invention also relates to a gas generating device for airbag and a gas generating device for seatbelt pretensioner, each of which being equipped with the ignition system.

RELATED ART

Heretofore, various electric igniters have been developed as an igniter for a gas generating device for expanding an airbag mounted onto an automobile, and as an igniter for a gas microgenerator used in a seatbelt pretensioner.

Such an igniter typically comprises a metal pin for electrical connection to the outside, and an ignition element for igniting explosives is provided on the other end of the metal pin.

As such an ignition element is known an ignition element incorporated into a printed sub-circuit as disclosed in Patent Document 1.

On the other hand, it is considered to control ignition of the igniter through communication with a LAN-based airbag system.

In this case, as described in Patent Document 2, it is necessary to install an electric circuit for communication and ignition into the igniter.

However, the installation of the electric circuit for communication and ignition into the igniter could result in an increase in the igniter size and the number of assembling steps.

Moreover, when a reliability test such as thermal transient test or the like is conducted as a common way to assess the reliability in adhesion between an ignition element and an ignition powder, it is required to load the above-mentioned functions onto a circuit for ASIC (Application Specific Integrated Circuit), and hence there is concern in the increase of production steps and in the increase of the size. For this reason, it is known to install the electric circuit for communication and ignition on the outside of the igniter.

For example, Patent Document 3 discloses an example where the electric circuit for communication and ignition is installed in a connector connected to the igniter.

Patent Document 1: U.S. Pat. No. 5,544,585
Patent Document 2: Japanese Patent No. 3,294,582
Patent Document 3: JP-A-2004-1723

SUMMARY OF THE INVENTION

Problems to be Solved by the Invention

According to the method disclosed in Patent Document 3 wherein an electric circuit for communication and a capacitor for ignition are mounted onto a connector of an igniter, some measures should be taken at the side of the igniter for suppressing noise and static electricity to the igniter.

It is common to use a diode, a varistor or the like as a countermeasure for suppressing noise and static electricity to the igniter. However, in case of an ignition element according to the present invention achieving ignition at a low voltage, it is highly sensitive to noise and static electricity, so that the diode and varistor are difficult to attain proper protection due to their insufficient protection capability.

The present invention is developed in light of the above situations and is to propose an ignition system which is capable of surely operating by electric energy stored in a capacitor for ignition while separating an igniter from electric circuits for communication and ignition without producing improper operation through static electricity and noise and is compact and excellent in the productivity.

It is another object of the present invention to propose a gas generating device for airbag and a gas generating device for seatbelt pretensioner, each of which devices being equipped with such an ignition system.

Means for Solving Problems

The inventors have made various studies on an ignition system that is normally operated by electric energy stored in a capacitor for ignition without producing improper operation through static electricity and noise in order to achieve the above objects, and as a result, the following findings have been obtained:

(1) Since the capacitor has a property of storing electric energy, the removal of noise and static electricity may be attained efficiently by absorbing instantaneously generated variation in voltage with such a capacitor.

Particularly, a multi-layer ceramic capacitor is most suitable for protecting SCB, which is a sensitive ignition element for BUS system, from static electricity and electromagnetic noise.

However, the igniter is operated by discharging electric energy stored in the capacitor for ignition in the electric circuit for communication connected to the igniter, so that when a capacitor is used for electrostatic protection, voltage discharged from the capacitor for ignition is decreased by the capacitor for electrostatic protection depending on the balance of electrostatic capacity between both the capacitors, and hence troubles such as non-ignition and the like may be caused in the actual operation.

(2) Accordingly, when the capacitor is used for a countermeasure against static electricity as described in the above item (1), it is important to balance the electrostatic capacities between the capacitor for electrostatic protection and the capacitor for ignition. By appropriately taking this balance can be surely conducted the ignition.

(3) In order to ensure reliability and productivity, it is advantageous to separate the igniter from the electric circuit for communication and ignition.

This is for the following reasons:

a) If the igniter is integrally united with the electric circuit for communication and ignition, when the reliability test such as thermal transient test or the like is conducted as a common way to assess the reliability in adhesion between an ignition element and an ignition powder, it is required to load the above-mentioned functions onto the circuit for ASIC, and hence there is concern in the increase of production steps and in the increase of the size. However, by separating the igniter from the electric circuit is eliminated the need for loading all of these functions onto the circuit for ASIC.

b) It is possible to simplify the structure of the igniter by separating the igniter from the electric circuit for communication and ignition.

c) There is an advantage that it is not necessary to arrange the electric circuit for communication and ignition under a special environment such as inside of the igniter.

The present invention is based on the above-mentioned findings.

That is, the summary and construction of the present invention are as follows:

1. An ignition system comprising an igniter, which includes a cup body having an opening at one end, a closure plug for holding a plurality of electrode pins insulated from each other and sealing the opening of the cup body, an ignition powder filled in the inside of the cup body and an SCB chip mounted on the closure plug and electrically connected to the electrode pins for causing the ignition powder to ignite upon energization, and a connector for connecting the igniter to an ECU;

wherein a circuit for ASIC is arranged in the connector to cause ignition by discharge from a capacitor for ignition incorporated in the circuit for ASIC, and wherein a capacitor for electrostatic protection is electrically connected in parallel to the SCB chip within the igniter.

2. An ignition system comprising an igniter, which includes a cup body having an opening at one end, a closure plug for holding a plurality of electrode pins insulated from each other and sealing the opening of the cup body, an ignition powder filled in the inside of the cup body and an SCB chip mounted on the closure plug and electrically connected to the electrode pins for causing the ignition powder to ignite upon energization, and a connector for connecting the igniter to an ECU and an adapter for connecting the igniter to the connector;

wherein a circuit for ASIC is arranged in the adaptor to cause ignition by discharge from a capacitor for ignition incorporated in the circuit for ASIC, and wherein a capacitor for electrostatic protection is electrically connected in parallel to the SCB chip within the igniter.

3. The ignition system according to the item 1 or 2, wherein the capacitor for electrostatic protection has an equivalent series resistance of not more than 100 mΩ.

4. The ignition system according to any one of the items 1 to 3, wherein the capacitor for electrostatic protection has an electrostatic capacity (Cx) of 0.47 to 10 μF.

5. The ignition system according to any one of the items 1 to 4, wherein ignition is conducted by normal discharge of the capacitor for ignition while maintaining electrostatic protection by satisfying a relationship of the following equation (1):

$$V_F = \{(V_{AF}/Cd) \times (Cd+Cx)\} \quad (1),$$

where $V_F \leq Vd$, when a lowest ignition voltage of the ignition system is $V_F$, a charging voltage of the capacitor for ignition is Vd, an electrostatic capacity of the capacitor for electrostatic protection is Cx, an electrostatic capacity of the capacitor for ignition is Cd, and all-fire voltage of an SCB chip determined by the Bruceton method at a state of not connecting the capacitor for electrostatic protection (Cx=0) is $V_{AF}$.

6. The ignition system according to the item 5, wherein the capacitor for ignition has an electrostatic capacity (Cd) of 0.68-22 μF.

7. The ignition system according to the item 5 or 6, wherein the lowest ignition voltage ($V_F$) of the ignition system is 6-25 V.

8. A gas generating device for airbag comprising an ignition system as described in any one of the items 1 to 7.

9. A gas generating device for seatbelt pretensioner comprising an ignition system as described in any one of the items 1 to 7.

Effect of the Invention

According to the present invention, it is possible to eliminate improper operation due to static electricity and noise and surely operate the system with electric energy from the capacitor for ignition by balancing the electrostatic capacity between the capacitor for electrostatic protection and the capacitor for ignition and further selecting preferably the performance of the SCB chip.

In the present invention, it is also possible to separate the igniter from the electric circuit such as ASIC or the like, and only the capacitor for electrostatic protection is mounted onto the igniter, so that the igniter can be manufactured in the same procedure as in the conventional igniter without increasing the size of the igniter, thereby improving the productivity/reliability.

In the ignition device formed by integrally uniting the conventional igniter with the circuit for ASIC, even if the measurement is carried out for confirming the reliability as an igniter (such as for testing conduction of an ignition element), the measurement is impossible due to the intervention of the circuit for ASIC. However, it becomes possible by using such separation type as in the ignition system of the present invention.

BEST MODE FOR CARRYING OUT THE INVENTION

The present invention will be concretely described below.

Figure 1:
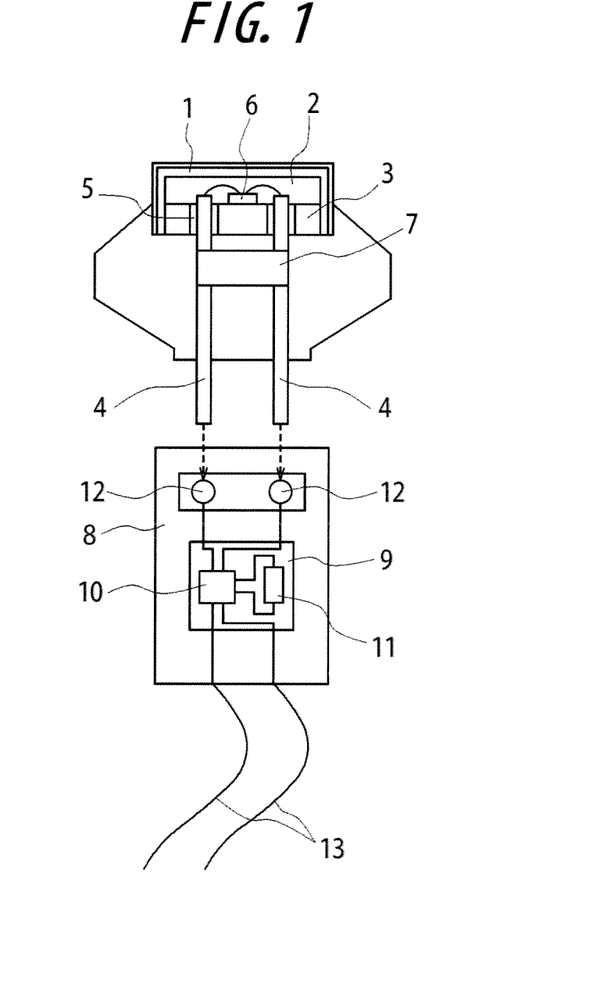
FIG. 1 is a view illustrating a preferable example of the ignition system according to the present invention.

FIG. 1 illustrates a preferable example of the ignition system according to the present invention. In this figure, numeral 1 is a cup body, which is typically constituted with a metal cylindrical body. Numeral 2 is an ignition powder. In addition, numeral 3 is a metal closure plug, in which electrode pins 4 for electrical connection to the outside are fixed to the closure plug 3 with a glass seal 5. Thus, by fixing the electrode pins with the glass seal may be ensured electrical insulation while holding high airtightness. Further, the interior of the cup body is sealed under high airtightness by welding the metal cup body to the metal portion of the closure plug. In addition, the closure plug 3 is equipped with a thin-film ignition element (SCB chip) 6.

Numeral 7 is a capacitor for electrostatic protection. The capacitor 7 for electrostatic protection is electrically connected in parallel to the ignition element 6. According to the present invention, the capacitor for electrostatic protection functions as means for preventing improper operation of the igniter due to static electricity and noise.

Furthermore, numeral 8 is a connector to be connected to the above electrode pins 4, and numeral 9 a circuit for ASIC in the substrate equipped with elements necessary for the electric circuit such as ASIC, a capacitor for ignition and so on, and numeral 10 ASIC, and numeral 11 a capacitor for ignition. The electrode pins 4 in the igniter are connected to electrodes 12 of the connector. Moreover, numeral 13 is connector wires, in which the wires 13 are connected to a LAN-based airbag system to be connected to a central control unit.

Figure 2:
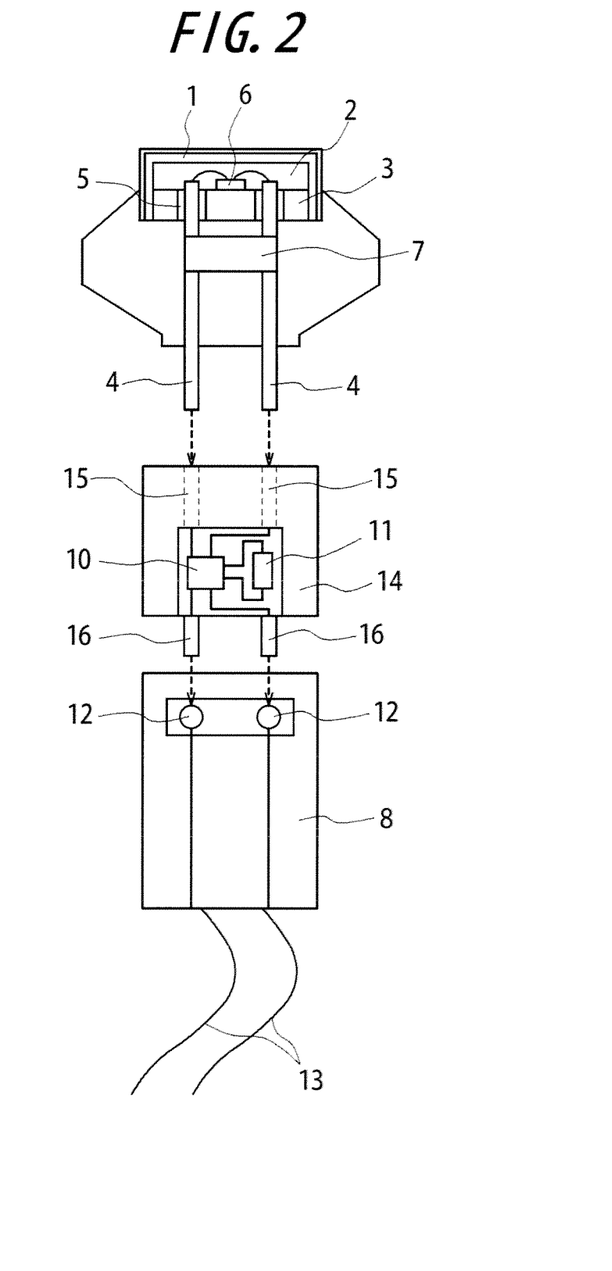
FIG. 2 is a view illustrating another preferable example of the ignition system according to the present invention.

In FIG. 2 is shown another preferable example of the ignition system according to the present invention. This example is a case that an adapter 14 is disposed between the igniter and the connector and the circuit 9 for ASIC is arranged in the adapter 14. In this example, the electrode pins 4 of the igniter are connected to electrodes 15 of the adapter, while electrodes 16 of the adapter are connected to the electrodes 12 of the connector 12. Then, as is the case with FIG. 1, the connector wires 13 are connected to LAN-based BUS signal lines to be connected to the central control unit.

As used herein, ASIC (Application Specific Integrated Circuit) 10 is an integrated circuit for specific use. According to the present invention, it functions as an intercommunication switching means for igniting the igniter based on encoded information through wired, or possibly wireless intercommunication with the outside. Also, the capacitor 11 for ignition functions as a storing means of electric energy.

According to such a construction, it is possible to separate the igniter from the electric circuits such as ASIC and so on, and only the capacitor for electrostatic protection is mounted onto the igniter, so that the igniter can be manufactured in the same procedure as in the conventional igniter without increasing the size of the igniter, thereby improving the productivity/reliability.

Figure 3:
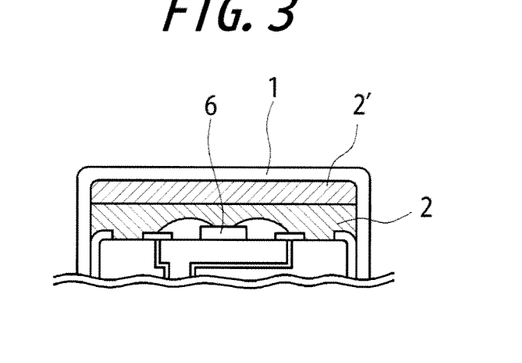
FIG. 3 is a view illustrating a state of filling an ignition powder and an inflammation powder within a cup body.

According to the present invention, the powdery ignition powder 2 is arranged in an innermost portion of the cup body 1. The ignition powder 2 may be a single layer structure of one type of explosive as shown in FIGS. 1 and 2, but it is more advantageous to provide such a double layer structure that an inflammation powder 2' having a greater inflammability is arranged outside the ignition powder 2 as shown in FIG. 3.

In this case, the inflammation powder 2' is preferable to contain zirconium in its composition. In addition, it is advantageously suitable to contain titanium hydride, boron, tricinate or the like.

As the ignition powder 2, those disclosed, for example, in JP-A-2002-362992 may be used in addition to the aforementioned ones without limitation.

Then, the ignition element 6 is arranged in contact with the ignition powder 2.

At this moment, it is advantageous to apply the ignition powder composition on the top surface of the ignition element for more stabilizing the contact between the ignition element and the ignition powder.

Moreover, it is advantageous that the ignition powder 2 and ignition element 6 come into pressure contact with each other.

To this end, it is preferable that the closure plug 3 is inserted into the cup body 1 at a press-fitting force of the order of 1 to 250 MPa and fixed thereto.

Into the circuit 9 for ASIC according to the present invention are incorporated the ASIC 10 as means for intercommunication and for triggering a particular sequence of electrical pulses and the capacitor 11 for ignition as means for storing electrical energy.

The circuit 9 for ASIC is incorporated in the connector 8 connected to the igniter via the electrode pins 4 as shown in FIG. 1, or in the adapter 14 interposed between the igniter and the connector as shown in FIG. 2. It is then connected to the LAN-based airbag system in communication with the central unit described below through two connector wires 13.

According to such a construction, only the capacitor for electrostatic protection is mounted onto the igniter, so that the igniter can be manufactured in the same procedure as in the conventional igniter without increasing the size of the igniter, thereby improving the productivity/reliability.

In the present invention, a so-called SCB chip capable of providing ignition at a low energy is used as the ignition element 6. Particularly, the SCB chip is more advantageous to have a bridge structure of laminated metal and insulator layers because a large spark can be generated at a low energy. As used herein, SCB means Semi-Conductor-Bridge, which represents an ignition element fabricated by using production steps for usual semiconductor ICs.

As the above-mentioned bridge structure, it is advantageously suitable to alternately laminate titanium and $SiO_2$ (or boron) on a silicon substrate. Preferably, each layer has a thickness of about 0.05-10 μm. More preferably, the thickness is 0.1-4 μm.

As another bridge structure, it is applicable to alternately laminate at least one selected from the group consisting of nickel chrome alloy, nickel, aluminum, magnesium and zirconium with at least one selected from the group consisting of calcium, manganese, silicon dioxide and silicon.

The above-mentioned capacitor for electrostatic protection will now be described below.

The capacitor 7 for electrostatic protection is electrically connected in parallel to the ignition element 6. For instance, there are a method of mounting onto the top surface of the closure plug 3 likewise the ignition element 6, and a method of disposing between the electrode pins 4 as disclosed in Japanese Utility Model No. 3118048.

As to the capacitor for electrostatic protection, it is preferable to have an equivalent series resistance as a resistance inherent to the capacitor of not more than 100 mΩ.

Because, as the resistance value becomes lower, static electricity can be absorbed more effectively by the capacitor. In this respect, aluminum electrolytic capacitor and tantalum capacitor have a high resistance value, and hence some current flows into the SCB side, which makes it difficult to prevent electrostatic discharge effectively.

Especially, ceramic capacitors are advantageously suitable as the capacitor for electrostatic protection.

Because, the ceramic capacitor is low in the value of impedance for their frequency characteristics (equivalent series resistance) and excellent in the noise absorption characteristics as compared with aluminum electrolytic capacitor or tantalum capacitor.

As such a ceramic capacitor are included;

1. Type I ceramic capacitor ($TiO_2$): for temperature compensation;
2. Type II ceramic capacitor ($BaTiO_3$-based, PbO-based): for high dielectric constant; and
3. Type III ceramic capacitor ($SrTiO_3$ semiconductor-based): for high dielectrics.

All of them are suitable in the present invention and may be used properly depending on the intended use.

Furthermore, the capacitor to be used for electrostatic protection preferably has an electrostatic capacity of about 0.47-10 μF. More preferably, the electrostatic capacity is 0.68-4.7 μF. Because, the larger the electrostatic capacity of the capacitor, the larger the size of the capacitor and it is more difficult to install in the igniter.

Moreover, as the connecting means for the above capacitor are advantageously suitable, but not limited to, soldering, conductive epoxy resins, welding and so on.

The capacitor for ignition will now be described below.

The capacitor for ignition is incorporated in the circuit 9 for ASIC and stores electrical energy and discharges it to the SCB based on information encoded by the ASIC.

Such a capacitor for ignition is preferable to have a withstand voltage of not less than 25 V. Since a voltage of about 20 V is constantly applied to the capacitor for ignition as a charging voltage, if the withstand voltage is less than 25 V, there are feared some degradations such as reduction in electrostatic capacity of the capacitor and so on.

In addition, in order to ensure the ignition operation of the ignition system, it is necessary that the value of the charging voltage (Vd) of the capacitor for ignition is larger than the lowest ignition voltage ($V_F$) of the ignition system (Vd≥$V_F$).

The capacitor for ignition is preferable to have an electrostatic capacity of about 0.68-22 µF. This is due to the fact that the larger the electrostatic capacity of the capacitor, the larger the size of the capacitor and the harder the installing. More preferably, the electrostatic capacity is a range of 1.5-4.7 µF.

Further, a ceramic capacitor is more preferable because the size of the capacitor becomes relatively small.

Moreover, as the connecting means for the above capacitor are advantageously suitable, but not limited to, soldering, conductive epoxy resins, welding and so on.

As described above, according to the present invention, a capacitor is installed as a countermeasure for electrostatic protection on the igniter side. Thus, if the value of the electrostatic capacity is unsuitable in relation to the electrostatic capacity of the capacitor for ignition, the voltage characteristics constituting a differentiated waveform discharged from the capacitor for ignition could be transformed to low voltage characteristics by the capacitor for electrostatic protection, and further a part of the energy is absorbed, and as a result, a voltage applied to the SCB chip becomes small in the ignition operation and no ignition may be operated.

In the present invention, therefore, the lowest ignition voltage ($V_F$) for ensuring ignition of the ignition system is defined by the following equation (1) including an electrostatic capacity (Cx) of the capacitor for electrostatic protection, an electrostatic capacity (Cd) of the capacitor for ignition, and all-fire voltage ($V_{AF}$) of the SCB chip determined by the Bruceton method at a state of connecting no capacitor for electrostatic protection (Cx=0):

$$V_F = \{(V_{AF}/Cd) \times (Cd+Cx)\} \quad (1).$$

It is necessary that the lowest ignition voltage ($V_F$) of the ignition system is smaller than the charging voltage (Vd) of the capacitor for ignition (V≤Vd) in order to surely ignite the ignition system.

When the ignition system is constructed so as to have the lowest ignition voltage ($V_F$) satisfying the above-mentioned relationship, the igniter is protected from static electricity and noise, and it is possible to surely ignite the igniter with electrical energy discharged from the capacitor for ignition incorporated in the ASIC module. Moreover, the lowest ignition voltage ($V_F$) of the ignition system is preferable to be about 6-25 V in the light of the degree of freedom in designing the ignition system including sizing.

The ignition system according to the present invention may be communicated with the outside (e.g., the central control unit) by using the ASIC 10 as an intercommunication switching means and the capacitor for ignition 11 as an electrical energy storing means, which are incorporated in the circuit 9 for ASIC.

Accordingly, when such an igniter is used in each of airbag modules to be integrated in an automobile and connected via a LAN-based airbag system to a central control unit, it is possible to ignite only the desired airbag module(s) by the central control unit at the time of collision of the automobile, and it is useless to supply special electrical energy for initiating such an igniter.

In particular, such actions and effects are achieved by providing each igniter with the capacitor for ignition storing weak energy included in a voltage signal sent from the central control unit, using the SCB chip capable of igniting the igniter at a lower energy than the conventional case as an ignition element, and providing the ASIC as intercommunication and ignition switching means that can detect coded information from the central control unit and transmit commands to send the state of the igniter.

In the present invention, information used in the intercommunication with the central control unit means both information including a command to ignite each igniter and information reporting the state of each igniter element to the central control unit.

Next, a gas generating device for airbag will now be described using the igniter according to the present invention.

Figure 4:
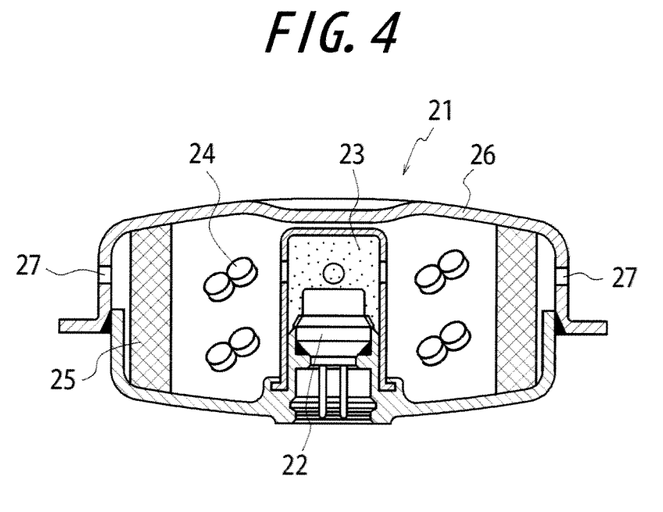
FIG. 4 is a conceptual diagram of a gas generating device for airbag.

FIG. 4 is a conceptual diagram of a gas generating device for airbag. As depicted in this figure, the interior of the gas generating device 21 for airbag contains an igniter 22, an enhancer agent 23, a gas generating agent 24 and a filter 25, while the exterior comprises an outer vessel 26 that can withstand combustion pressure of the gas generating agent 24. In the outer vessel 26 are opened apertures 27 for discharging the generated gas to the airbag side.

Upon operation of the igniter 22, the enhancer agent 23 is combusted by thermal energy generated from the igniter 22 to generate hot gas. By this hot gas is combusted the gas generating agent 24 to generate gas for expanding the airbag. The latter gas is discharged from the apertures 27 opened on the outer vessel 26 of the airbag to the outside, during which the gas is passed through the filters 25 to trap the residue of the combusted gas generating agent while cooling the gas itself.

By using the igniter of the present invention may be made compact the igniter regardless of the presence of communication circuitry including ASIC, so that there can be easily provided the gas generating devices for airbag with a dimension comparable to conventional shape.

A gas generating device for seatbelt pretensioner using the igniter according to the present invention will be further described below.

Figure 5:
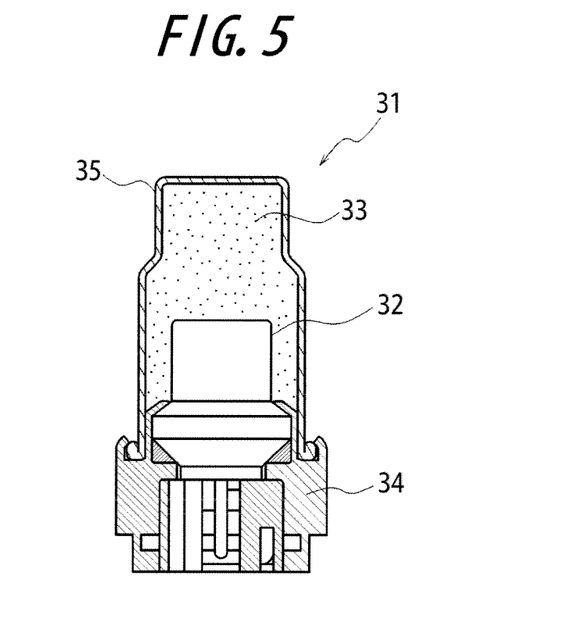
FIG. 5 is a conceptual diagram of a gas generating device for seatbelt pretensioner.

FIG. 5 is a conceptual diagram of a gas generating device for seatbelt pretensioner (a micro gas generator). As depicted in this figure, the micro gas generator 31 comprises an igniter 32 and a gas generating agent 33 in its interior. The igniter 32 is fixed to a pedestal 34 referred to as a holder. Further, a cup body 35 housing the gas generating agent 33 therein is also structured to be fixed to the holder, e.g., by swaging. Upon operation of the igniter 32, the gas generating agent 33 in the cup body 35 is combusted by heat from the igniter 32 to generate gas.

Even in the micro gas generator, by using the igniter of the present invention, may be made compact the igniter regardless of the presence of communication circuitry including ASIC, so that there can be easily provided the gas generating devices for airbag with a dimension comparable to conventional shape.

Next, ignition operation of the igniter according to the present invention will be described below.

Under normal operation conditions, i.e., when the airbag equipped with the igniter is not involved in, for example, an accident that requires expansion of the airbag, the capacitor for ignition as electrical energy storing means is at a state of storing energy based on signals for communication sent from the central control unit.

At this moment, when the operation of the igniter is required due to the impact of an accident or the like, the central control unit sends an ignition command in the form of a particular sequence of electrical pulses to the circuit 9 for ASIC in the igniter. In the circuit 9 for ASIC, electrical energy from the capacitor 11 for ignition is discharged by means of an electronic switch so as to release the stored electrical energy to the ignition element 6. The ignition element 6 starts combustion of the ignition powder 2 with the electrical energy from the capacitor for ignition 11.

The control procedure of the central control unit will now be described below.

Figure 6:
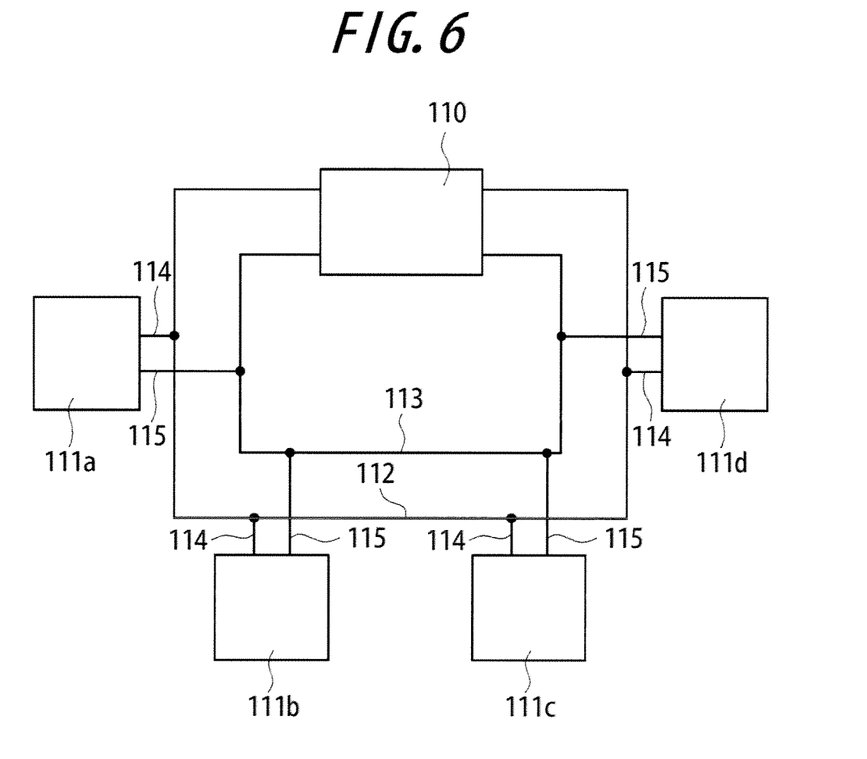
FIG. 6 is a view illustrating a central control unit.

FIG. 6 illustrates an example of a LAN-based airbag system connecting a central control unit 110 to four airbag modules 111*a*, 111*b*, 111*c*, 111*d*. Each of two airbag modules 111*b*, 111*c* may have a gas generator for expanding, e.g., a front airbag, while each of the remaining two airbag modules 111*a* and 111*d* may have a gas generator for expanding, e.g., a side airbag.

An igniter is accommodated in the gas generator included in each of these modules. Each igniter has two electrode pins 114 and 115. The electrode pin 114 is connected to a first power supply conductor 112 in communication with the central control unit 110, while the electrode pin 115 is connected to a second power supply conductor 113 in communication with the central control unit 110.

In normal operation state, i.e., when the automobile is not involved in a particular impact that requires activation of one or more airbag modules 111*a*, 111*b*, 111*c*, 111*d*, the central control unit 110 regularly supplies a low-intensity current to the power supply conductors 112, 113. Then, this current is sent through the electrode pins 114 and 115 to the electrical energy storing means (capacitors) of the igniter included in each of the four airbag modules 111*a*, 111*b*, 111*c*, 111*d*.

Upon impact, for example, if it is desired to activate the airbag 111*c*, the central control unit 110 sends a specific sequence of electrical pulses constituting an ignition command for the igniter in the airbag module 111*c* to the first power supply conductor 112. This specific sequence of electrical pulses is sent through the electrode pins 114, 115 to each igniter. However, only the intercommunication means included in the igniter of the airbag module 111*c* activates the electrical energy storing means associated with the ignition switching means in response to that command, activating the ignition powder as described above.

If it is desired to activate some of the airbag modules, e.g., airbag modules 111*a*, 111*b* subsequent to the impact, the central control unit 110 supplies a specific sequence of electrical pulses for an igniter included in each of the airbag modules 111*a* and 111*b* to the first power supply conductor 112. Each of the two igniters operates as described above.

Example

Consideration was made on the calculation of parameters for separating an igniter from electric circuits for communication and ignition, mounting a capacitor for electrostatic protection on the igniter side, and for surely operating the igniter by discharge from a capacitor for ignition having a given electrostatic capacity while preventing improper operation due to static electricity and noise according to the present invention.

The obtained results are shown in Tables 1 to 4.

TABLE 1

Amount of resistance change in anti-static electricity test based on capacitor capacity (N = 5) --- conditions of applying static electricity (i)

| | | Test Site: P-P 25 times | | Test Site: P-B 25 times | |
|---|---|---|---|---|---|
| No. | Initial Resistance | Resistance | Diff. from Init. | Resistance | Diff. from Init. |

I. Anti-static electricity test --- Amount of resistance change (Ω) in ignition element by capacitor for electrostatic protection: 0.22 μF

| 1 | 6.11 | ∞ (improper operation) | — | — | — |
| 2 | 6.12 | ∞ (improper operation) | — | — | — |
| 3 | 5.78 | ∞ (improper operation) | — | — | — |
| 4 | 5.89 | ∞ (improper operation) | — | — | — |
| 5 | 5.83 | ∞ (improper operation) | — | — | — |
| Average | | — | — | — | — |

II. Anti-static electricity test --- Amount of resistance change (Ω) of ignition elements by capacitor for electrostatic protection: 0.47 μF

| 1 | 6.16 | 6.05 | −0.11 | 6.02 | −0.14 |
| 2 | 5.59 | 5.47 | −0.12 | 5.44 | −0.15 |
| 3 | 5.66 | 5.55 | −0.11 | 5.51 | −0.15 |
| 4 | 5.94 | 5.83 | −0.11 | 5.79 | −0.15 |
| 5 | 5.71 | 5.60 | −0.11 | 5.56 | −0.15 |
| Average | | 5.70 | −0.11 | 5.66 | −0.15 |

III. Anti-static electricity test --- Amount of resistance change (Ω) of ignition elements by capacitor for electrostatic protection: 0.68 μF

| 1 | 5.94 | 5.93 | −0.01 | 5.91 | −0.03 |
| 2 | 6.10 | 6.08 | −0.02 | 6.06 | −0.04 |
| 3 | 6.15 | 6.14 | −0.01 | 6.12 | −0.03 |
| 4 | 5.59 | 5.58 | −0.01 | 5.57 | −0.02 |
| 5 | 5.96 | 5.95 | −0.01 | 5.93 | −0.03 |
| Average | | 5.94 | −0.01 | 5.92 | −0.03 |

IV. Anti-static electricity test --- Amount of resistance change (Ω) of ignition elements by capacitor for electrostatic protection: 1.00 μF

| 1 | 5.79 | 5.79 | 0.00 | 5.78 | −0.01 |
| 2 | 6.09 | 6.08 | −0.01 | 6.07 | −0.02 |
| 3 | 6.05 | 6.03 | −0.02 | 6.02 | −0.03 |
| 4 | 6.08 | 6.07 | −0.01 | 6.07 | −0.01 |
| 5 | 5.65 | 5.64 | −0.01 | 5.63 | −0.02 |
| Average | | 5.92 | −0.01 | 5.91 | −0.02 |

TABLE 2

Amount of resistance change in anti-static electricity test based on capacitor capacity (N = 5) --- Conditions of applying static electricity (ii)

| | | Test Site: P-P 25 times | | Test Site: P-B 25 times | |
|---|---|---|---|---|---|
| No. | Initial Resistance | Resistance | Diff. from Init. | Resistance | Diff. from Init. |
| I. Anti-static electricity test --- Amount of resistance change ($\Omega$) of ignition elements by capacitor for electrostatic protection: 0.68 µF ||||||
| 1 | 5.55 | ∞ (improper operation) | — | ∞ (improper operation) | — |
| 2 | 5.73 | ∞ (improper operation) | — | ∞ (improper operation) | — |
| 3 | 6.02 | ∞ (improper operation) | — | ∞ (improper operation) | — |
| 4 | 5.96 | ∞ (improper operation) | — | ∞ (improper operation) | — |
| 5 | 5.65 | ∞ (improper operation) | — | ∞ (improper operation) | — |
| Average | | — | — | — | — |
| II. Anti-static electricity test --- Amount of resistance change ($\Omega$) of ignition elements by capacitor for electrostatic protection: 1.00 µF ||||||
| 1 | 5.64 | 5.52 | −0.12 | ∞ (erroneously ignited) | — |
| 2 | 5.89 | 5.75 | −0.14 | ∞ (erroneously ignited) | — |
| 3 | 5.88 | 5.76 | −0.12 | ∞ (erroneously ignited) | — |
| 4 | 5.89 | 5.71 | −0.18 | ∞ (erroneously ignited) | — |
| 5 | 5.69 | 5.53 | −0.16 | ∞ (erroneously ignited) | — |
| Average | | 5.65 | −0.14 | — | — |
| III. Anti-static electricity test --- Amount of resistance change ($\Omega$) of ignition elements by capacitor for electrostatic protection: 1.47 µF ||||||
| 1 | 5.83 | 5.78 | −0.05 | 5.76 | −0.07 |
| 2 | 5.68 | 5.65 | −0.03 | 5.61 | −0.07 |
| 3 | 5.74 | 5.66 | −0.08 | 5.62 | −0.12 |
| 4 | 5.76 | 5.71 | −0.05 | 5.69 | −0.07 |
| 5 | 5.75 | 5.70 | −0.05 | 5.67 | −0.08 |
| Average | | 5.70 | −0.05 | 5.67 | −0.08 |
| IV. Anti-static electricity test --- Amount of resistance change ($\Omega$) of ignition elements by capacitor for electrostatic protection: 2.00 µF ||||||
| 1 | 6.14 | 6.11 | −0.03 | 6.10 | −0.04 |
| 2 | 5.94 | 5.92 | −0.02 | 5.92 | −0.02 |
| 3 | 5.72 | 5.70 | −0.02 | 5.70 | −0.02 |
| 4 | 5.89 | 5.91 | 0.02 | 5.85 | −0.04 |
| 5 | 5.9 | 5.89 | −0.01 | 5.88 | −0.02 |
| Average | | 5.91 | −0.01 | 5.89 | −0.03 |

Tables 1 and 2 indicate amounts of resistance change based on anti-static electricity in the ignition element of the igniter. Table 1 is reported under the conditions of applying static electricity (i) as mentioned later, while Table 2 is reported under the conditions of applying static electricity (ii) as mentioned later.

As the above-mentioned amount of resistance change becomes larger, damage to the ignition element is more likely to occur.

In this example, the resistance of the ignition element (SCB) is 5-6$\Omega$, and commercially available ceramic capacitors are used as a capacitor for electrostatic protection, and comparisons are made based on six different electrostatic capacities of 0.22 µF, 0.47 µF, 0.68 µF, 1.00 µF, 1.47 µF and 2.00 µF.

The test is conducted by applying static electricity to the predetermined sites of the igniter provided with each of ceramic capacitors having four electrostatic capacities selected from the above-mentioned six capacities.

Figure 7:
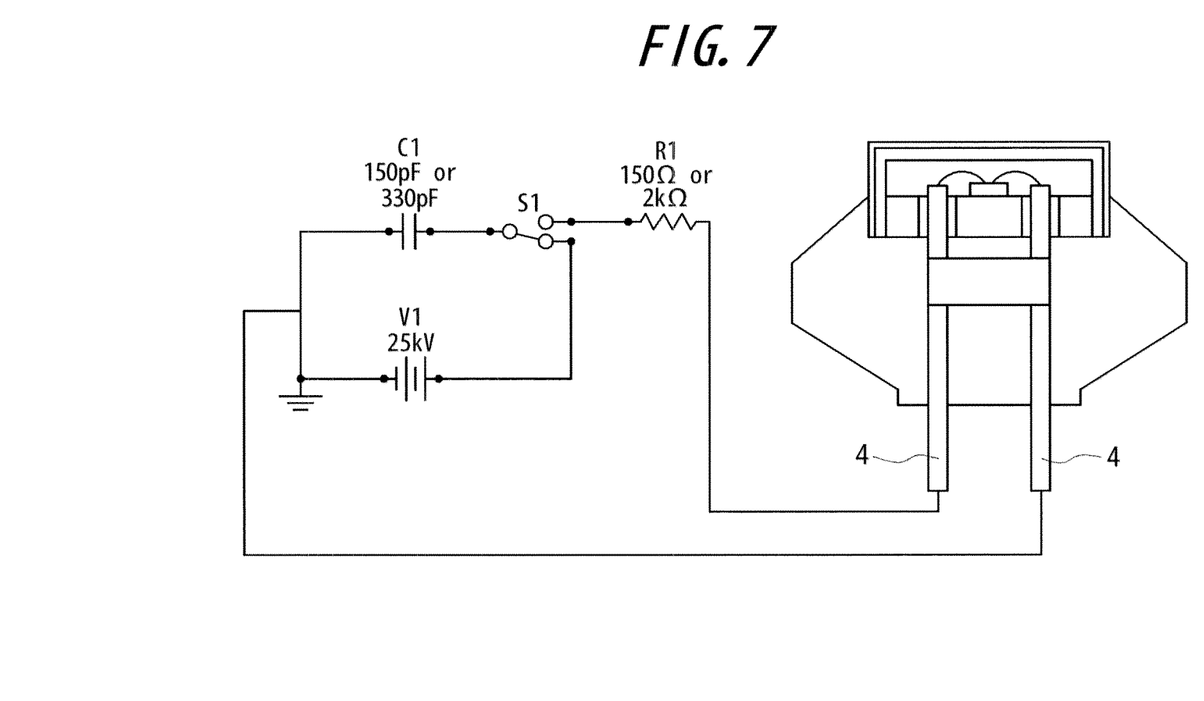
FIG. 7 is a view illustrating a state of applying static electricity to two electrode pins (P-P)
Figure 8:
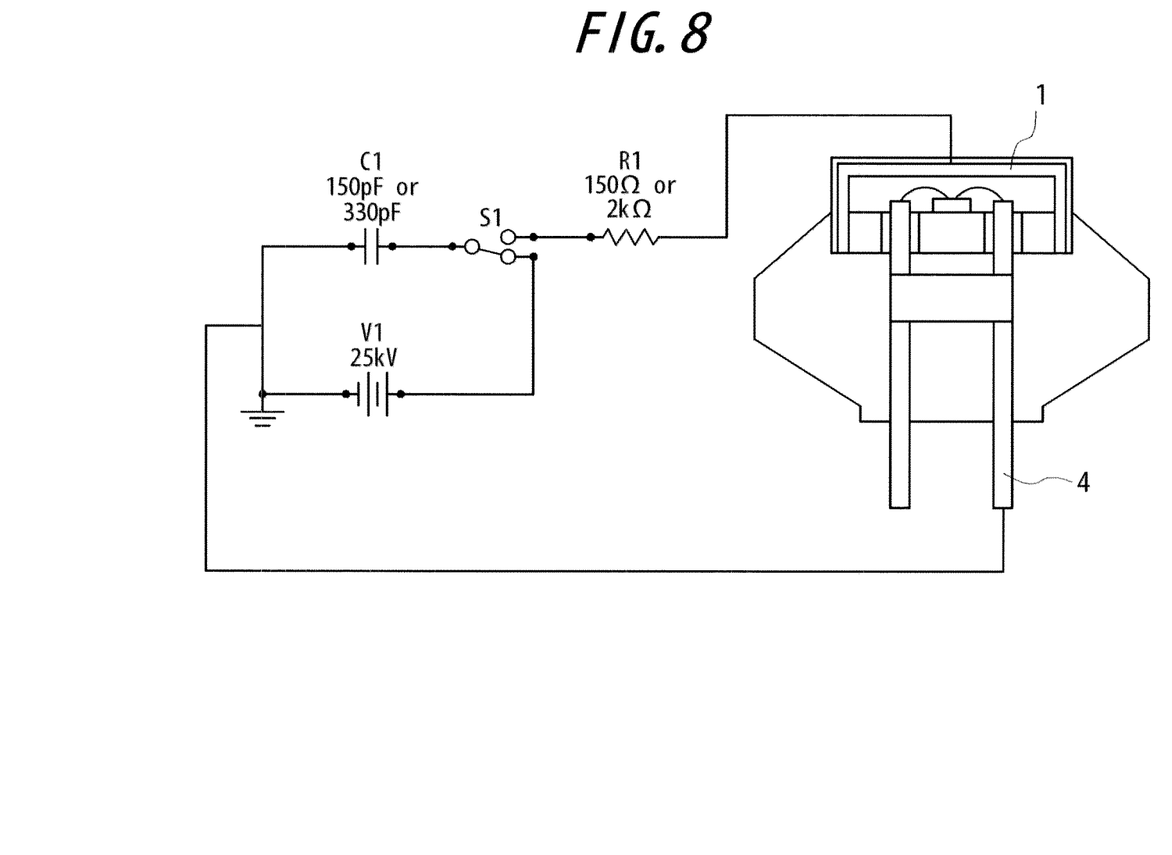
FIG. 8 is a view illustrating a state of applying static electricity to one electrode pin and a metal cup body (P-B).

Sites for Applying Static Electricity:
(1) Application to two electrode pins 4 (see FIG. 7), which shows "Test Site: P-P" in Table 1;
(2) Application to one electrode pin 4 and the metal cup body 1 (see FIG. 8), which shows "Test Site: P-B" in Table 1.

Conditions of Applying Static Electricity (i):
static electricity charging capacitor: 150 pF
charging voltage: 25 kV
internal resistance: 150$\Omega$
application times: 25

Conditions of Applying Static Electricity (ii):
static electricity charging capacitor: 330 pF
charging voltage: 25 kV
internal resistance: 2 k$\Omega$
application times: 25

The above-mentioned conditions of applying static electricity are typical conditions in the specification of each anti-static electricity test.

As a result, in the conditions for the static electricity (i), when the electrostatic capacity of the capacitor for electrostatic protection is 0.22 µF, all of the subjects are improper operation. Also, when the electrostatic capacity is 0.47 µF, the resistance change of the ignition elements ranges from −0.11 to −0.15 and some effects are observed due to the application of static electricity, but improper operation of the resistor is not observed, exerting a protective effect to some extent against the application of static electricity under the conditions (i). Moreover, when the electrostatic capacity of the capacitor for electrostatic protection is 0.68 µF or more, there are neither improper operation nor increase in the amount of resistance change of the ignition elements at all.

Under the more stringent conditions for the static electricity (ii), when the electrostatic capacity of the capacitor for electrostatic protection is 0.68 µF, all of the subjects are improper operation. Also, when the electrostatic capacity is 1.00 µF, all of the subjects erroneously ignite in case of the static electricity applying site of "Test Site: P-B"; whereas in case of the site of "Test Site: P-P", some effects are observed due to the application of static electricity, but the improper operation of the resistor is not observed, exerting a protective effect to some extent against the application of static electricity under the conditions (ii). Moreover, when the electrostatic capacity of the capacitor for electrostatic protection is 1.47 µF or more, there are no improper operation, erroneous ignition nor increase in the amount of resistance change of the ignition elements.

As seen from the above results, the improper operation of the ignition system may be prevented by employing a capacitor with an electrostatic capacity of 0.47 µF or more as a capacitor for electrostatic protection under an environment of applying static electricity as expected in the conditions (i).

Table 4 reports the results obtained by calculating the lowest ignition voltage ($V_F$) capable of surely igniting the ignition system according to the present invention comprising a combination of a capacitor for ignition and a capacitor for electrostatic protection, each having a different electrostatic capacity according to the above-mentioned equation (1). This indicates the results of calculating the lowest ignition voltage capable of surely igniting the ignition system by the capacitor for ignition according to the equation (1) of $V_F=(V_{AF}/Cd)\times(Cd+Cx)$ based on the electrostatic capacity of the capacitor for ignition (Cx), all-fire voltage ($V_{AF}$) obtained in Table 3 and electrostatic capacity of the capacitor for electrostatic protection (Cd). In this case, in order to surely ignite the ignition system, it is necessary that the charging voltage (Vd) of the capacitor for ignition is larger than the lowest ignition voltage ($V_F$) of the ignition system ($Vd \geq V_F$).

Taking into account the degree of freedom in designing vehicle safety devices with the ignition system including ECU, and further considering optimization of electrostatic capacity and size in the capacitor for smaller size design of the ignition system, it is desirable that the lowest ignition voltage ($V_F$) of the ignition system is set between 6 and 25 V. The ignition systems falling within this preferred range are highlighted by underline in Table 4. That is, each ignition system underlined in Table 4 including a combination of a capacitor for electrostatic protection and a capacitor for ignition represents the one whose lowest ignition voltage ($V_F$) is set between 6 and 25 V, which is more preferable as the ignition system according to the present invention. Therefore, from Table 4, it is possible to provide ignition systems taking into account the balance of size and energy capacity by setting combinations of capacitors for electrostatic protection and capacitors for ignition.

TABLE 3

Ignition charge voltage of 99.9999% based on electrostatic capacity of capacitor for ignition

| | | All-Fire Charge Voltage (V) |
|---|---|---|
| Electrostatic capacity of capacitor for ignition (µF) | 0.47 | 13.0 |
| | 0.68 | 11.8 |
| | 1.0 | 10.6 |
| | 1.47 | 10.6 |
| | 2.2 | 8.9 |
| | 3.3 | 8.3 |
| | 4.7 | 7.8 |
| | 6.8 | 7.8 |
| | 10 | 7.0 |
| | 22 | 6.7 |

TABLE 4

Lowest ignition voltages $V_F$ (V) of ignition systems based on combination of capacitor for ignition and capacitor for electrostatic protection

| | | Electrostatic capacity of capacitors for electrostatic protection Cx (µF) | | | | | | | | |
|---|---|---|---|---|---|---|---|---|---|---|
| | | 0.47 | 0.68 | 1.0 | 1.47 | 2.2 | 3.3 | 4.7 | 6.8 | 10 |
| Electrostatic capacity of capacitor for ignition Cd (µF) | 0.47 | 26.0 | 31.8 | 40.7 | 53.7 | 73.9 | 104.3 | 143.0 | 201.1 | 289.6 |
| | 0.68 | <u>20.0</u> | <u>23.6</u> | 29.2 | 37.3 | 50.0 | 69.1 | 93.4 | 129.8 | 185.3 |
| | 1.0 | <u>15.6</u> | <u>17.8</u> | <u>21.2</u> | 26.2 | 33.9 | 45.6 | 60.4 | 82.7 | 116.6 |
| | 1.47 | <u>14.0</u> | <u>15.5</u> | <u>17.8</u> | <u>21.2</u> | 26.5 | 34.4 | 44.5 | 59.6 | 82.7 |
| | 2.2 | <u>10.8</u> | <u>11.7</u> | <u>12.9</u> | <u>14.8</u> | <u>17.8</u> | <u>22.3</u> | 27.9 | 36.4 | 49.4 |
| | 3.3 | <u>9.5</u> | <u>10.0</u> | <u>10.8</u> | <u>12.0</u> | <u>13.8</u> | <u>16.6</u> | <u>20.1</u> | 25.4 | 33.5 |
| | 4.7 | <u>8.6</u> | <u>8.9</u> | <u>9.5</u> | <u>10.2</u> | <u>11.5</u> | <u>13.3</u> | <u>15.6</u> | <u>19.1</u> | <u>24.4</u> |
| | 6.8 | <u>8.3</u> | <u>8.6</u> | <u>8.9</u> | <u>9.5</u> | <u>10.3</u> | <u>11.6</u> | <u>13.2</u> | <u>15.6</u> | <u>19.3</u> |
| | 10 | <u>7.3</u> | <u>7.5</u> | <u>7.7</u> | <u>8.0</u> | <u>8.5</u> | <u>9.3</u> | <u>10.3</u> | <u>11.8</u> | <u>14.0</u> |
| | 22 | <u>6.8</u> | <u>6.9</u> | <u>7.0</u> | <u>7.1</u> | <u>7.4</u> | <u>7.7</u> | <u>8.1</u> | <u>8.8</u> | <u>9.7</u> |

* In this table, the underlined values highlight those ignition systems falling within a reasonable range, $V_F$ = 6 to 25 V.

In Table 3, for an igniter having no capacitor for electrostatic protection, an ignition sensitivity of a capacitor for ignition having different electrostatic capacity is experimentally determined, and the thus obtained value is taken as a standard ignition charge voltage in the capacitor for ignition. In this case, as the standard ignition charge voltage in the capacitor for ignition is used all-fire voltage ($V_{AF}$) with a reliability of 99.9999% that is determined by the Bruceton method as a common method of determining performance sensitivity of airbags for automobile. At this moment, all-fire voltage ($V_{AF}$) is determined for each capacitor while changing the electrostatic capacity of the capacitor for ignition in nine stages. The results are reported in Table 3.

| REFERENCE NUMERALS | |
|---|---|
| 1 | Cup body |
| 2 | Ignition powder |
| 2' | Inflammation powder |
| 3 | Closure plug |
| 4 | Electrode pins |
| 5 | Glass seal |
| 6 | Thin film ignition element (SCB chip) |
| 7 | Capacitor for electrostatic protection |
| 8 | Connector |
| 9 | Circuit for ASIC |

-continued

| REFERENCE NUMERALS | |
|---|---|
| 10 | ASIC |
| 11 | Capacitor for ignition |
| 12 | Connector electrodes |
| 13 | Connector wires |
| 14 | Adapter |
| 15, 16 | Adapter electrodes |
| 21 | Gas generating device for airbag |
| 22 | Igniter |
| 23 | Enhancer agent |
| 24 | Gas generating agent |
| 25 | Filter |
| 26 | Outer vessel |
| 27 | Aperture |
| 31 | Gas generating device for seatbelt pretensioner (micro gas generator) |
| 32 | Igniter |
| 33 | Gas generating agent |
| 34 | Pedestal (holder) |
| 35 | Cup body |
| 110 | Central control unit |
| 111a-111d | Airbag module |
| 114, 115 | Electrode pin |

What is claimed is:

1. An ignition system comprising:
(a) an igniter, which includes a cup body having an opening at one end,
a closure plug for holding a plurality of electrode pins insulated from each other and sealing the opening of the cup body,
an ignition powder filled in the inside of the cup body and an SCB (semiconductor bridge) chip mounted on the closure plug and electrically connected to the electrode pins for causing the ignition powder to ignite upon energization;
(b) a connector having electrodes to be connected to the electrodes pins of the igniter and connector wires to be connected to a central control unit, the connector connecting the igniter to an electronic control unit ECU;
(c) a circuit being a substrate equipped with an application specific integrated circuit (ASIC) and a capacitor for ignition, the circuit for ASIC being arranged in the connector to cause ignition by discharge from the capacitor for ignition, and
(d) a capacitor for electrostatic protection, within the igniter, electrically connected in parallel to the SCB chip within the igniter.

2. An ignition system comprising:
(a) an igniter, which includes a cup body having an opening at one end,
a closure plug for holding a plurality of electrode pins insulated from each other and sealing the opening of the cup body,
an ignition powder filled in the inside of the cup body and an SCB (semiconductor bridge) chip mounted on the closure plug and electrically connected to the electrode pins for causing the ignition powder to ignite upon energization;
(b) a connector having electrodes and connector wires to be connected to a central control unit, the connector for connecting the igniter to an electronic control unit (ECU);
(c) an adapter having electrodes to be connected to the electrode pins of the igniter and electrodes to be connected to the electrodes of the connector with the adapter being disposed between the igniter and the connector for connecting the igniter with the connector;
(d) a circuit being a substrate equipped with an application specific integrated circuit (ASIC) and a capacitor for ignition, the circuit for ASIC being arranged in the adapter to cause ignition by discharge from the capacitor for ignition, and
(e) a capacitor for electrostatic protection within the igniter electrically connected in parallel to the SCB chip within the igniter.

3. The ignition system according to claim 1 or 2, wherein the capacitor for electrostatic protection has an equivalent series resistance of not more than 100 mΩ.

4. The ignition system according to claim 1 or 2 wherein the capacitor for electrostatic protection has an electrostatic capacity (Cx) of 0.47 to 10 μF.

5. The ignition system according to claim 1 or 2, wherein ignition is conducted by normal discharge of the capacitor for ignition while maintaining electrostatic protection by satisfying a relationship of the following equation (1):

$$V_F = \{(V_{AF}/Cd) \times (Cd+Cx)\} \quad (1),$$

where $V_F \leq Vd$,
when a lowest ignition voltage of the ignition system is $V_F$, a charging voltage of the capacitor for ignition is Vd, an electrostatic capacity of the capacitor for electrostatic protection is Cx, an electrostatic capacity of the capacitor for ignition is Cd, and all-fire voltage of an SCB chip determined by the Bruceton method at a state of not connecting the capacitor for electrostatic protection (Cx=0) is $V_{AF}$.

6. The ignition system according to claim 5, wherein the capacitor for ignition has an electrostatic capacity (Cd) of 0.68 to 22 μF.

7. The ignition system according to claim 5, wherein the lowest ignition voltage ($V_F$) of the ignition system is 6-25 V.

8. A gas generating device for airbag comprising an ignition system as claimed in claim 1 or 2.

9. A gas generating device for seatbelt pretensioner comprising an ignition system as claimed in claim 1 or 2.

10. The ignition system according claim 3 wherein the capacitor for electrostatic protection has an electrostatic capacity (Cx) of 0.47 to 10 μF.

11. The ignition system according to claim 3 wherein ignition is conducted by normal discharge of the capacitor for ignition while maintaining electrostatic protection by satisfying a relationship of the following equation (1):

$$V_F = \{(V_{AF}/Cd) \times (Cd+Cx)\} \quad (1),$$

where $V_F \leq Vd$,
when a lowest ignition voltage of the ignition system is $V_F$, a charging voltage of the capacitor for ignition is Vd, an electrostatic capacity of the capacitor for electrostatic protection is Cx, an electrostatic capacity of the capacitor for ignition is Cd, and all-fire voltage of an SCB chip determined by the Bruceton method at a state of not connecting the capacitor for electrostatic protection (Cx=0) is $V_{AF}$.

12. The ignition system according to claim 4 wherein ignition is conducted by normal discharge of the capacitor for ignition while maintaining electrostatic protection by satisfying a relationship of the following equation (1):

$$V_F = \{(V_{AF}/Cd) \times (Cd+Cx)\} \quad (1),$$

where $V_F \leq Vd$,
when a lowest ignition voltage of the ignition system is $V_F$, a charging voltage of the capacitor for ignition is Vd, an electrostatic capacity of the capacitor for electrostatic protection is Cx, an electrostatic capacity of the capacitor for ignition is Cd, and all-fire voltage of an SCB chip determined by the Bruceton method at a state of not connecting the capacitor for electrostatic protection (Cx=0) is $V_{AF}$.

13. The ignition system according to claim 6 wherein the lowest ignition voltage ($V_F$) of the ignition system is 6-25 V.

14. A gas generating device for airbag comprising an ignition system as claimed in claim 3.

15. A gas generating device for seatbelt pretensioner comprising an ignition system as claimed in claim 3.

16. A gas generating device for airbag comprising an ignition system as claimed in claim 4.

17. A gas generating device for seatbelt pretensioner comprising an ignition system as claimed in claim 4.

18. A gas generating device for airbag comprising an ignition system as claimed in claim 5.

19. A gas generating device for seatbelt pretensioner comprising an ignition system as claimed in claim 5.

20. A gas generating device for airbag comprising an ignition system as claimed in claim 6.

21. A gas generating device for seatbelt pretensioner comprising an ignition system as claimed in claim 6.

22. A gas generating device for airbag comprising an ignition system as claimed in claim 7.

23. A gas generating device for seatbelt pretensioner comprising an ignition system as claimed in claim 7.

* * * * *